(12) United States Patent
Ueno

(10) Patent No.: US 7,983,132 B2
(45) Date of Patent: Jul. 19, 2011

(54) OPTICAL DISK APPARATUS

(75) Inventor: Keishi Ueno, Iruma (JP)

(73) Assignee: TEAC Corporation, Tama-shi, Tokyo (JP)

( * ) Notice: Subject to any disclaimer, the term of this patent is extended or adjusted under 35 U.S.C. 154(b) by 1101 days.

(21) Appl. No.: 11/584,067

(22) Filed: Oct. 20, 2006

(65) Prior Publication Data
US 2007/0091747 A1 Apr. 26, 2007

(30) Foreign Application Priority Data

Oct. 25, 2005 (JP) .................................. 2005-310322
Sep. 1, 2006 (JP) .................................. 2006-237605

(51) Int. Cl.
*G11B 20/00* (2006.01)

(52) U.S. Cl. .................................................. 369/60.01
(58) Field of Classification Search ........................ None
See application file for complete search history.

(56) References Cited

U.S. PATENT DOCUMENTS

| | | | | |
|---|---|---|---|---|
| 6,163,516 | A * | 12/2000 | Ma | 369/59.2 |
| 6,879,551 | B2 * | 4/2005 | Kim | 369/44.41 |
| 7,372,797 | B2 * | 5/2008 | Kanaoka et al. | 369/59.22 |
| 2001/0006500 | A1 | 7/2001 | Nakajima et al. | |

FOREIGN PATENT DOCUMENTS

| | | |
|---|---|---|
| JP | 4258814 A | 9/1992 |
| JP | 7-98938 | 4/1995 |
| JP | 8129758 A | 5/1996 |
| JP | 2001250341 A | 9/2001 |

OTHER PUBLICATIONS

English Language Translation of Japanese Office Action relating to Japanese Patent Application No. 2006/237605, mailed May 11, 2010, 3 pages.
Japanese Office Action relating to Japanese Patent Application No. 2006/237605, mailed May 11, 2010, 2 pages.

* cited by examiner

*Primary Examiner* — Joseph H Feild
*Assistant Examiner* — Parul Gupta
(74) *Attorney, Agent, or Firm* — Seed IP Law Group PLLC

(57) ABSTRACT

An optical disk apparatus for enhancing time resolution of an RF sum signal. A reproduction sum signal (a signal A+a signal D) on the leading side and a reproduction sum signal (a signal B+a signal C) on the following side, which have been output from a four-quadrant photodetection section of an optical pickup, are supplied to first and second A/D converters. The first A/D converter samples a signal in accordance with a first clock signal CLK, and the second A/D converter samples a signal in accordance with a second clock signal CLK. The first and second clock signals CLK are out of phase with each other. By means of a phase difference between the clock signals, a phase difference between the leading-side reproduction signals and the following-side reproduction signals is compensated for. The phase difference between the first and second clock signals CLK is adjusted such that the quality of a reproduction signal, such as jitter, an error rate, or the like, is optimized.

14 Claims, 9 Drawing Sheets

OPTICAL DISK APPARATUS

PRIORITY INFORMATION

This application claims priority to Japanese Patent Application No. 2005-310322 filed on Oct. 25, 2005 and Japanese Patent Application No. 2006-237605 filed on Sep. 1, 2006, which are incorporated herein by reference in their entireties.

BACKGROUND OF THE INVENTION

1. Technical Field

The present invention relates to an optical disk apparatus and, more particularly, to processing of a reproduction signal output from a split photodetection section.

2. Related Art

A known optical disk apparatus hitherto radiates, on an optical disk, a laser beam of reproduction power from a laser diode of an optical pickup; subjects light reflected from the optical disk to photoelectric conversion performed by a four-quadrant photodetection section of the optical pickup; and adds signals output from respective photodetectors of the four-quadrant photodetection section, thereby acquiring a reproduction RF signal. When the laser beam of reproduction power passes by a pit in the optical disk, there arises a case where a phase difference occurs in output signals of the four-quadrant photodetector stemming from the light reflected by the pit, where some of the output signals are located on a leading side with respect to an advancing direction of the laser beam over pits (hereinafter called simply "leading-side signals") and the other signals are located on a following side with respect to the same (hereinafter called simply "following-side signals") The phase difference is ascribable to diffraction induced by the depth of the pit in the optical disk or the pickup optical disk, and changes according to the type of an optical disk apparatus, the type of an optical disk, a reproduction speed, or the like. In relation to the type of an optical disk, in a CD/DVD-ROM signals on the following side tend to lag behind signals on the leading side; in a CD/DVD-RW signals on the following side generally tend to lead signals on the leading side; and in a CD/DVD-R a phase difference tends to hardly arise.

FIG. 4 shows the configuration of a reproduction system of the optical disk apparatus, and FIG. 5 shows the phases of respective signals. In FIG. 4, a pit 6 is formed in a track 5 on an optical disk, and a laser beam 100 of reproduction power is radiated onto the optical disk. A four-quadrant photodetection section 10a detects the light reflected from the optical disk. The four-quadrant photodetection section 10a is divided into four photodetectors; namely, photodetectors A to D. The photodetectors A and B are located at the inner radius of the optical disk, and the photodetectors C and D are located at the outer radius of the same. The photodetectors A, D and the photodetectors B, C are assumed to be split with respect to the direction of the track 5 on the optical disk, and the pit 6 is assumed to move from the right direction of the drawing toward the beam in association with rotation of the optical disk. Under these assumptions, the photodetectors A and D form a group of photodetectors located on the leading side, and the photodetectors B and C form a group of photodetectors located on the following side. A signal A output from the photodetector A, a signal B output from the photodetector B, a signal C output from the photodetector C, and a signal D output from the photodetector D are supplied to an adder 16, where all of the signals are added, and a reproduction RF signal (the signal A+the signal B+the signal C+the signal D) is output. The reproduction RF signal is supplied to the decoder, where the signal is demodulated.

The signals A, D are on the leading side, and the signals B, C are on the following side. There arises a case where the signals on the following side cause a phase difference with respect to the-signals on the leading side for reasons of the type of the optical disk, diffraction induced by the depth of a pit, or the like. FIG. 5 shows a case where the signals on the following side cause a phase lag behind the signals on the leading side. Specifically, the signals B+C on the following side lag in phase behind the signals A+D on the leading side by an amount corresponding to time "t."

When such a phase lag has arisen, a decrease occurs in the resolution of the reproduction RF signal that is the sum of these signals, and an increase in jitter or deterioration of quality of a reproduction signal is induced during demodulation.

Japanese Patent Laid-Open Publication No. Hei 7-98,938 describes, in an attempt to reduce the distortion of a waveform of a reproduction signal attributable to a frequency characteristic of an optical head, placing at least a pair of photodetectors used for receiving light reflected from an optical disk in alignment with the direction of an information track on an optical disk; placing, at one output stage of the pair of photodetectors, advancement means for advancing a phase of an output from the photodetector in high frequencies; and adding an output from the advancement means and an output from the other output stage of the pair of photodetectors.

However, as mentioned above, the phase difference changes in various manners according to the type of the optical disk apparatus, the type of an optical disk, a reproduction speed, and the like. Hence, the phase difference cannot be compensated for by means of advancing or delaying a phase in an analog fashion by the advancement means, so that the quality of a reproduction signal cannot be sufficiently improved.

SUMMARY OF THE INVENTION

The present invention provides an optical disk apparatus capable of reliably compensating for a phase difference between signals on a leading side and signals on a following side, which change in various manners according to the type of an optical disk, and reducing a decrease in resolution of a reproduction sum signal, to there by improve the quality of a reproduction signal by means of reducing the resolution of a reproduction sum signal.

An optical disk apparatus of the present invention comprises: light-receiving means split into at least two elements in a direction of a track of an optical disk, each of the split elements subjecting light reflected from the optical disk to photoelectric conversion and outputting a first reproduction RF signal and a second reproduction RF signal; first analog-to-digital conversion means for converting the first reproduction RF signal into a digital signal, to thereby output a first digital signal; second analog-to-digital conversion means for converting the second reproduction RF signal into a digital signal, to thereby output a second digital signal; addition means for adding the first digital signal to the second digital signal, to thereby output a signal; first clock supply means for supplying to the first analog-to-digital conversion means a first clock signal used for issuing a conversion timing; second clock supply means for supplying to the second analog-to-digital conversion means a second clock signal used for issuing a conversion timing; and adjustment means for compensating for a phase difference between the first reproduction RF signal and the second reproduction RF signal by means of adjusting a phase difference between the first clock signal and the second clock signal.

An optical disk apparatus of the present invention comprises: light-receiving means which is split into a plurality of elements in a direction of a track of an optical disk, each of the thus-split elements subjecting light reflected from the optical disk to photoelectric conversion and outputting an RF signal; delay means for delaying an RF signal of a timewise-leading element, from among RF signals from the respective elements, by a predetermined amount of delay corresponding to the number of elements into which the light-receiving means is split and a leading time; and addition means for adding delayed RF signals of the respective elements.

According to the present invention, a phase difference between the two clock signals used for instructing conversion timing of the analog-to-digital conversion means (A/D) is adjusted, thereby compensating for a phase difference between the first reproduction RF signal and the second reproduction RF signal. In the present invention, conversion timing; i.e., sampling timing, is adjusted to thus compensate for a phase difference. Accordingly, even when the phase difference between the first reproduction RF signal and the second reproduction RF signal has changed in various manners according to the type of the optical disk and the reproduction speed, a decrease in the resolution of a reproduction sum signal is avoided by means of correspondingly adjusting the phase difference between the clock signals in an adaptive manner, thereby ensuring the quality of the reproduction signal.

Further, according to the present invention, RF signals from the respective elements acquired by splitting are delayed, as appropriate, and the thus-delayed signals are summed. Thus, the PR class is substantially converted, and hence the amplitude of a short signal, such as a 2T signal, can be readily detected.

The invention will be more clearly comprehended by reference to the embodiments provided below. However, the scope of the invention is not limited to those embodiments.

BRIEF DESCRIPTION OF THE DRAWINGS

Preferred embodiments of the present invention will be described in detail based on the following figures, wherein.

DETAILED DESCRIPTION OF THE PREFERRED EMBODIMENTS

Embodiments of the present invention will be described hereinbelow by reference to the drawings.

First Embodiment

Figure 1:
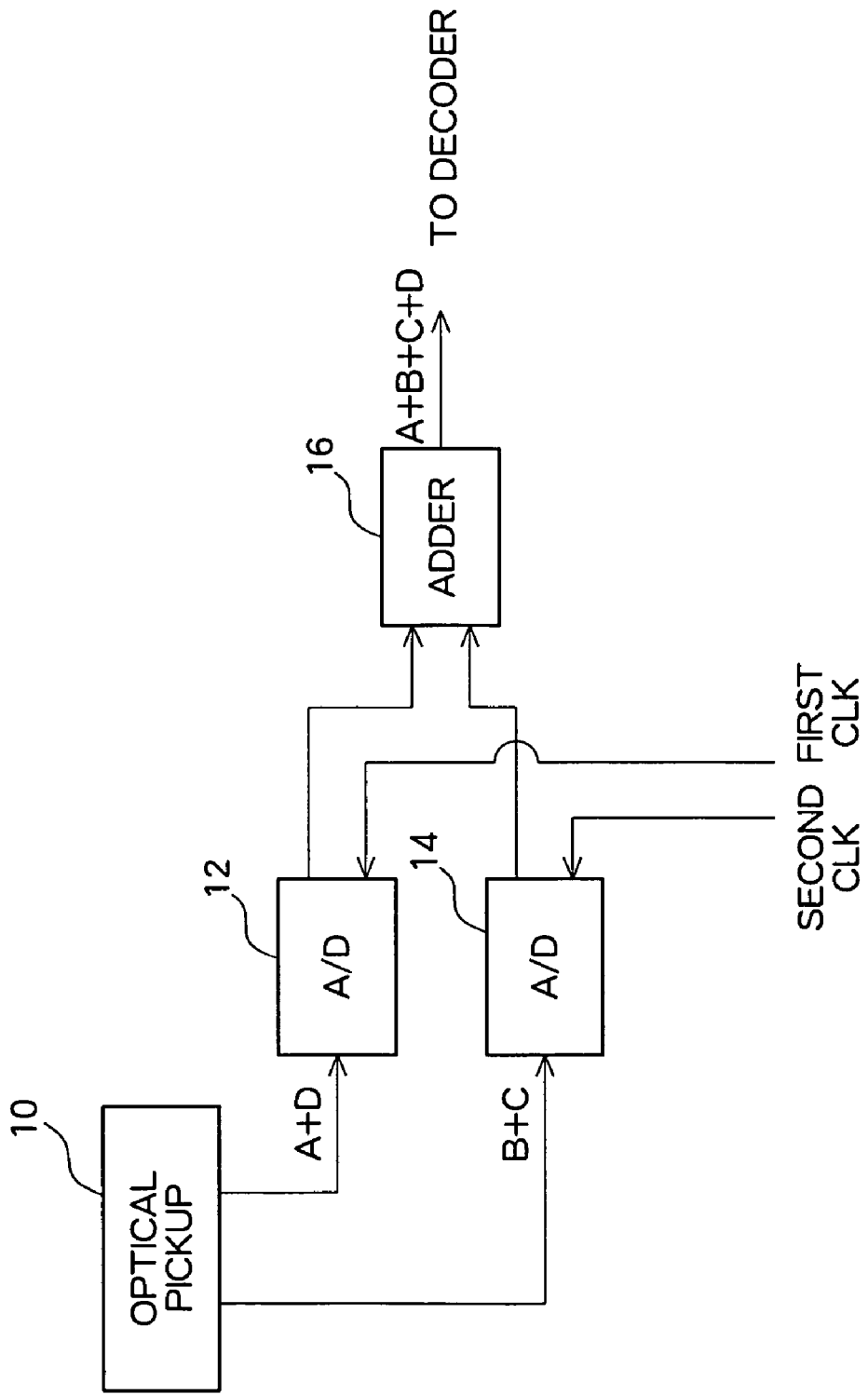
FIG. 1 is a conceptual block diagram of an optical disk apparatus according to an embodiment of the present invention.

FIG. 1 shows a conceptual configuration of an optical disk apparatus according to a first embodiment of the present invention. The optical disk apparatus broadly has a recording system for recording data and a reproduction system for reproducing the data recorded in an optical disk. However, since the configuration of the recording system is analogous to a well-known configuration, only the configuration of the reproduction system is shown.

Figure 4:
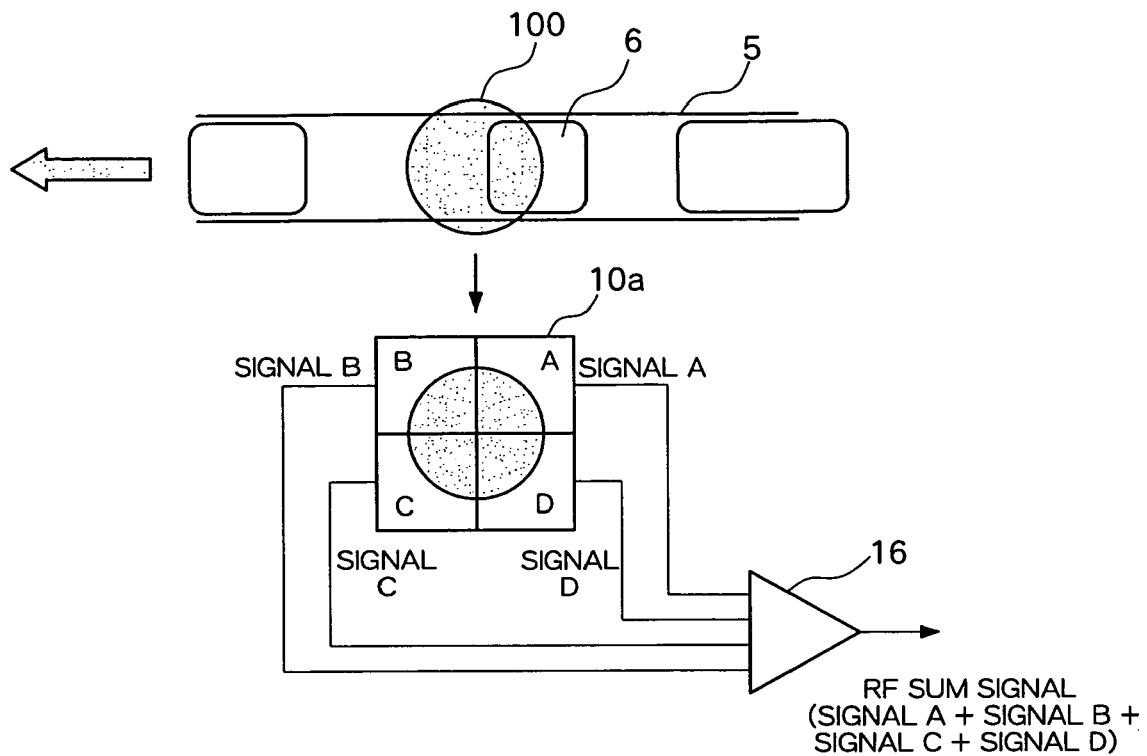
FIG. 4 is a descriptive view of generation of a conventional reproduction RF signal.
Figure 5:
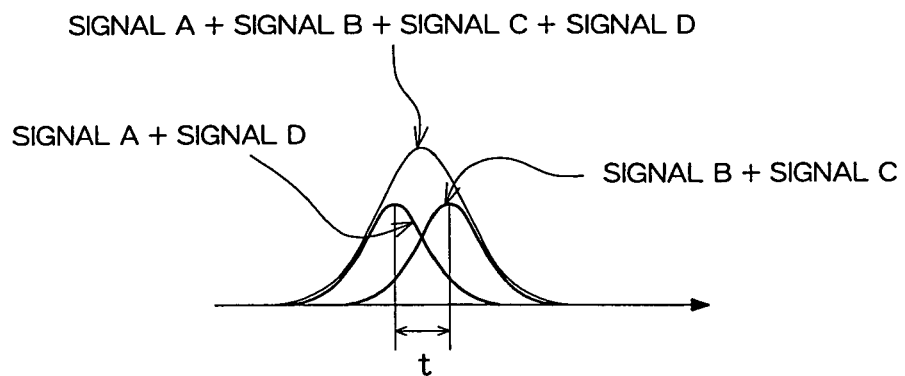
FIG. 5 is a descriptive view of a phase difference existing between a signal on the leading side and a signal on the following side.

In addition to including a light source and a lens which are used for radiating a laser beam on an optical disk, an optical pickup 10 includes a four-quadrant photodetection section which subjects light reflected from the optical disk to photoelectric conversion to thereby output an RF signal. During reproduction of data, a laser beam of reproduction power is emitted from the light source, and respective detectors of the four-quadrant photodetection section receive the reflected light and output the light in the form of RF signals. As shown in FIG. 4, the four-quadrant photodetection section is formed from detectors A to D, of which the detectors A and D are assumed to be located on a leading side. The detectors B and C are assumed to be located on the following side. The photodetector A outputs a signal A; the photodetector B outputs a signal B; the photodetector C outputs a signal C; and the photodetector D outputs a signal D. A sum signal A+D, which is the sum of the signals A and D output from the leading-side photodetectors A and D, is supplied to an analog-to-digital converter (A/D) 12, and a sum signal B+C, which is the sum of the signals B and C output from the photodetectors B and C, is supplied to an analog-to-digital converter (A/D) 14.

Each of the A/D 12 and the A/D 14 converts an input analog signal into a digital signal. Timing of digital conversion; namely, sampling timing, is controlled by a first clock signal (a first CLK signal) and a second clock signal (a second CLK signal). Specifically, the A/D 12 converts the sum signal A+D into a digital signal in accordance with the first CLK signal, and the A/D 14 converts the sum signal B+C into a digital signal in accordance with the second CLK signal. The first CLK signal and the second CLK signal are shifted in phase from each other, so that the sampling timing of the A/D 12 differs from that of the A/D 14. The phase difference between the first CLK signal and the second CLK signal is adjusted in accordance with a phase difference between the sum signal A+D—which is derived from signals on the leading side—and the sum signal B+C—which is derived from signals on the following side. When the sum signal B+C, which is on the following side, lags behind the sum signal A+D, which is on the leading side, the phase of the second CLK signal is caused to lag behind the phase of the first CLK signal by an amount corresponding to the lag. Thus, the phase difference between the signal on the preceding side and the signal on the following side is compensated for. The digital sum signal A+D output from the A/D 12 and the digital sum signal B+C output from the A/D 14 are supplied to an adder 16.

The adder 16 adds the two signals to thus generate a digital sum signal A+B+C+D. The signal is a sum signal; i.e., the sum of the signals output from the four photodetectors of the four-quadrant photodetection section, and is supplied to a decoder as a reproduction signal.

In the present embodiment, the phase difference between the signals on the leading side and the signals on the following side is compensated for by means of adjusting the sampling timing of the A/D 12 and that of the A/D 14. Hence, even when the phase difference has changed in various manners according to the type of an optical disk apparatus and that of an optical disk, the phase difference between the first CLK signal and the second CLK signal is adaptively adjusted, thereby compensating for the phase difference between the signals on the leading side and the signals on the following side with high accuracy.

The first CLK signal and the second CLK signal may be generated by different clock signal generators or by a single clock signal generator. The phase difference between the first CLK signal and the second CLK signal must be adjusted so as to become equal to the phase difference between the signals on the leading side and the signals on the following side. Therefore, various clock signals whose phases are shifted from the phase of the first CLK signal are generated as second CLK signals, and the signals are supplied to the A/D 14. The quality of a reproduction signal, such as jitter, an error rate, or the like, is monitored, and a clock signal having the phase at which best reproduction quality is achieved is selected as the second CLK signal. As a matter of course, when the phase difference between the signals on the leading side and the signals on the following side can be detected in advance with high accuracy by arbitrary means, the first CLK signal and the second CLK signal may be generated from information about the phase difference.

The configuration of an optical disk apparatus of the present embodiment will be described in detail hereunder.

Figure 2:
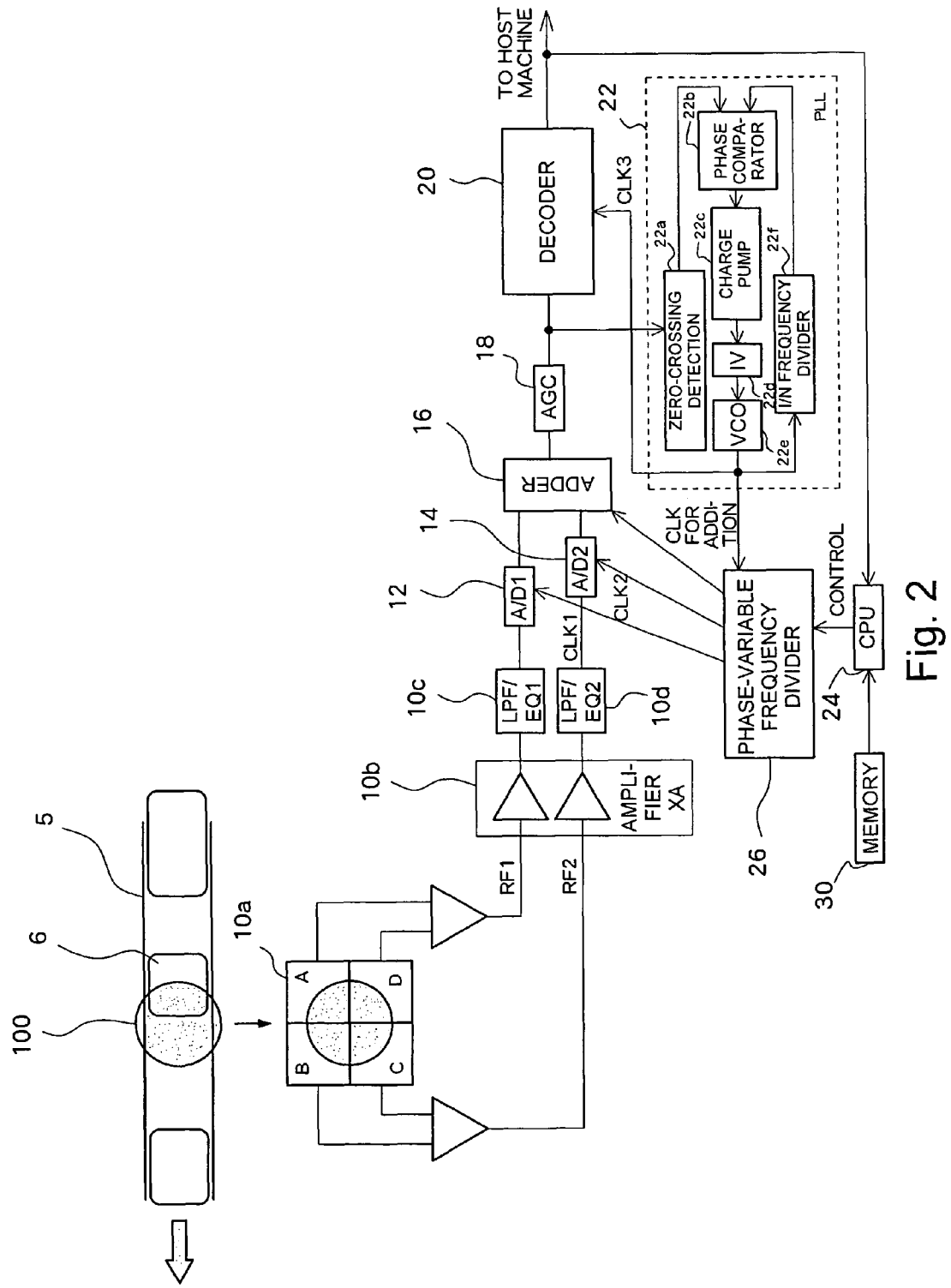
FIG. 2 is a configuration block diagram of the optical disk apparatus of the present embodiment.

FIG. 2 is a configuration block diagram of the optical disk apparatus of the present embodiment. A laser beam 100 is radiated on a pit 6 formed in a track 5 of an optical disk, and the quarter-quadrant photodetection section 10a of the optical pickup detects the light reflected from the pit. The quarter-quadrant photodetector is formed from four photodetectors A to D. The detectors A and D are placed on the leading side in the moving direction of the optical disk (in the direction of the arrow in the drawing), and the detectors B and C are placed on the following side in the moving direction of the same. Signals output from the detectors A and D are summed and supplied as an RF1 signal to an amplifier 10b, and signals output from the detectors B and C are summed and supplied as an RF2 signal to the amplifier 10b.

The amplifier 10b amplifies the signals at a gain A, and supplies the thus-amplified signals to low-pass-filters-and-equalizers LPF/EQ 10c, 10d.

The LPF/EQ 10c and the LPF/EQ 10d eliminate high-frequency noise from the RF 1 signal and the RF 2 signal, or slightly boost a specific frequency band and supply the thus-boosted frequency band to the A/D 12 and the A/D 14. The LPF/EQ 10c and the LPF/EQ 10d are preferably of the same characteristics; and may also be a plain LPF or may exhibit a slight boosting characteristic in the vicinity of the highest frequency.

The A/D 12 and the A/D 14 convert the RF1 signal and the RF2 signal into digital signals. Conversion timing of the A/D 12 is determined by the clock signal CLK1, and the RF1 signal is sampled at the rise timing of the clock signal CLK1 and converted into a digital signal. Conversion timing of the A/D 14 is determined by the clock signal CLK2, and the RF2 signal is sampled at the rise timing of the clock signal CLK2 and converted into a digital signal. The clock signals CLK1 and CLK2 are generated by a phase-variable frequency divider 26 and supplied to the A/D 12 and the A/D 14. The clock signals CLK1 and CLK2 differ in phase from each other, and the phase difference between the RF1 signal and the RF2 signal is compensated for by this phase difference. The A/D 12 and the A/D 14 supply the digital signals to the adder 16.

The adder 16 adds two digital signals, to thus generate a reproduction signal. After the gain of the reproduction signal has been adjusted by an AGC (Automatic Gain Control circuit) 18, the reproduction signal is supplied to a decoder 20. The signal demodulated by the decoder 20 is supplied, as reproduced data, to a host machine such as a personal computer or the like and to a CPU 24 for evaluating the quality of decoding operation, such as jitter, as well. The decoder 20 demodulates a digital signal (the digital RF1 signal and the digital RF2 signal) by use of a clock signal CLK3 supplied from a PLL 22. The PLL 22 comprises a zero-crossing detector 22a for detecting that the reproduction signal from the AGC 18 crosses a zero point; a phase comparator 22b; a charge pump 22c; a current-to-voltage converter (IV) 22d; a voltage-controlled oscillator (VCO) 22e; and a 1/N frequency divider 22f. The PLL 22 outputs a clock signal synchronized with the phase of a reproduction signal input from the VCO 22e. The clock signal from the VCO 22e is supplied to the decoder 20 and to the phase-variable frequency divider 26, as well.

The CPU 24 measures an error rate of a decoded signal output from the decoder 20, and supplies to the phase-variable frequency divider 26 a control signal for reducing an error rate.

The phase-variable frequency divider 26 generates clock signals having various phase differences, by means of dividing the clock signal output from the PLL 22. Specifically, the phase-variable frequency divider 26 subjects the input clock signal to frequency division to thus generate the clock signal CLK1, and sequentially generates a plurality of clock signals having different phases by means of taking the clock signal CLK1 as a reference. The plurality of clock signals become candidates for the clock signal CLK2. The CPU 24 issues a command to the phase-variable frequency divider 26 in order to sequentially change the clock signal CLK2, thereby searching the phase of the clock signal at which jitter or an error rate is minimized and finally determining the phase of the clock signal CLK2. The phase-variable frequency divider 26 also supplies to the adder 16 a clock signal for addition. The clock signal for addition is also generated in accordance with the clock signal output from the VCO 22e. However, in the present embodiment, two different signals appropriate to the phase of the clock signal CLK2 are generated. The addition timing of the adder 16 is controlled by these two signals, thereby controlling whether the clock signal CLK2 is advanced or delayed in reference to the clock signal CLK1.

Figure 3:
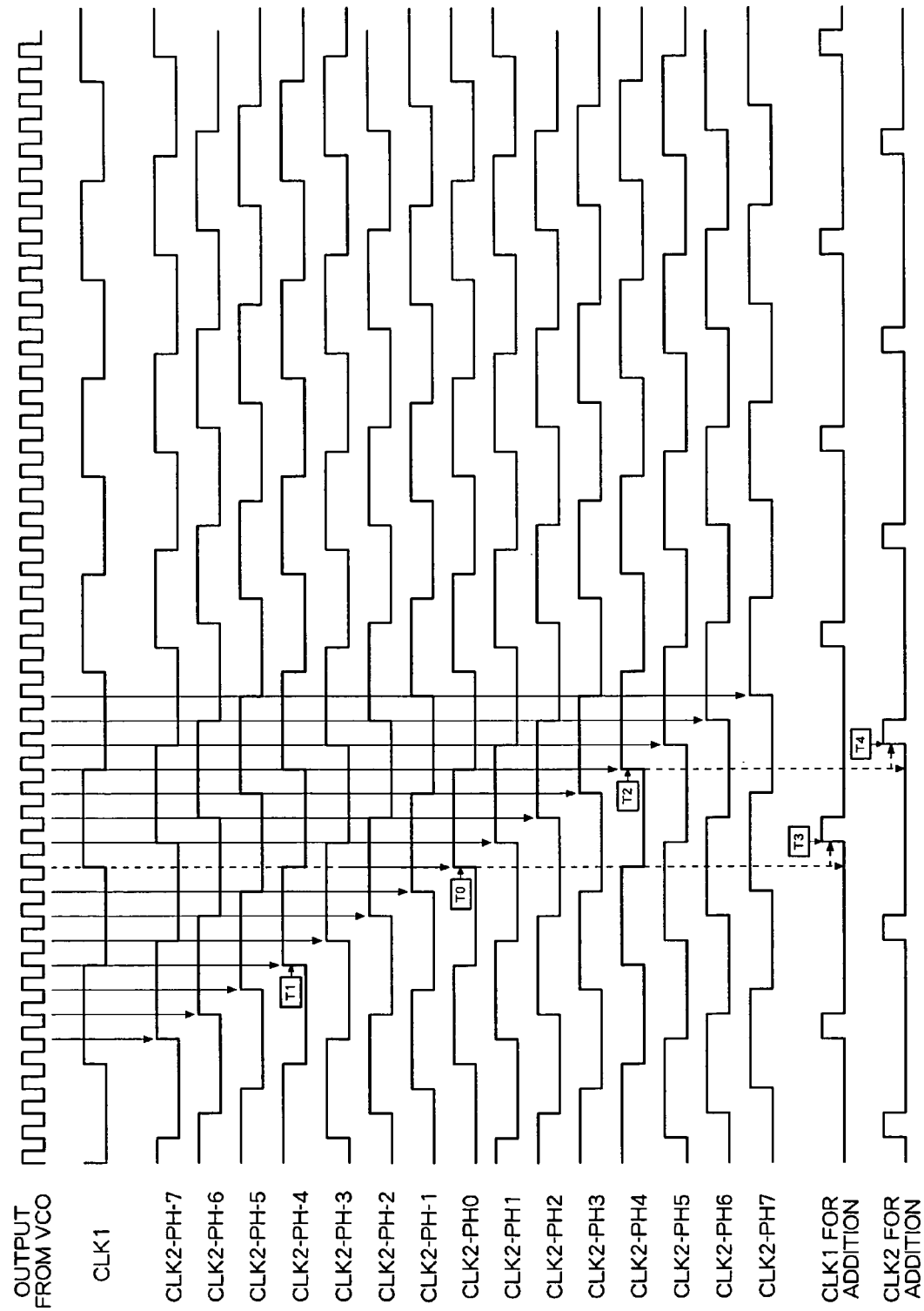
FIG. 3 is a timing chart showing the phase of a CLK2 signal and the phase of a CLK signal to be added.

FIG. 3 shows clock signals generated by the phase-variable frequency divider 26. The clock signals include a group of clock signals, which are generated by changing the phase of the clock signal CLK1 in various manners with reference to the phase of the clock signal CLK1, and a group of clock signals for addition purpose. The reference symbol VCO designates a signal output from the VCO 22e of the PLL 22. First, the phase-variable frequency divider 26 generates the clock signal CLK1 synchronized with the signal from the VCO 22e. In the present embodiment, the oscillation frequency of the VCO 22e of the PLL 22 is set to eight times the frequency of a channel clock signal (1 T of the RF signal, where T designates a reference time length). This clock signal CLK1 is supplied to the A/D 12.

Next, a plurality of clock signals having different phases are generated with reference to this clock signal CLK1. CLK2-PH-7 designates a signal which lags behind the clock signal CLK1 by an amount corresponding to one clock period of the signal output from the VCO. CLK2-PH-6 designates a signal which lags behind the clock signal CLK1 by an amount corresponding to two clock periods of the signal output from the VCO; namely, lags behind the CLK2-PH-7 by an amount corresponding to one clock period of the same. CLK2-PH-5 designates a signal which lags behind the clock signal CLK1 by three clock periods. CLK2-PH-4 designates a signal which lags behind the clock signal CLK1 by an amount corresponding to four clock periods of the same. CLK2-PH-3 designates a signal which lags behind the clock signal CLK1 by an amount corresponding to five clock periods of the same. CLK2-PH-2 designates a signal which lags behind the clock signal CLK1 by an amount corresponding to six clock periods of the same. CLK2-PH-1 designates a signal which lags behind the clock signal CLK1 by an amount corresponding to seven clock periods of the same. CLK2-PH0 designates a signal which lags behind the clock signal CLK1 by an amount corresponding to eight clock periods of the same and which is in phase with the clock signal CLK1. A CLK2-PH1 signal is in phase with the clock signal CLK2-PH-7. Likewise, CLK2-PH2 is in phase with the clock signal CLK2-PH-6. CLK2-PH3 is in phase with the clock signal CLK2-PH-5. CLK2-PH4 is in phase with the clock signal CLK2-PH-4. CLK2-PH5 is in phase with the clock signal CLK2-PH-3. CLK2-PH6 is in phase with the clock signal CLK2-PH-2. CLK2-PH7 is in phase with the clock signal CLK2-PH-1. As mentioned above, the phase-variable frequency divider 26 generates fifteen different clock signals CLK2-PH-7 to CLK2-PH7. In accordance with a command from the CPU 24, the phase-variable frequency divider 26 supplies any one of these fifteen different clock signals as the clock signal CLK2 to the A/D 14. For instance, the phase-variable frequency divider 26 sequentially supplies the fifteen different clock signals to the A/D 14. The CPU 24 monitors error rates of the respective clock signals and selects the clock signal involving the lowest error rate.

Here, for instance, the clock signal CLK2-PH-4 is in phase with the clock signal CLK2-PH4, and the A/D 14 samples the RF2 signal at the same timing. By means of the clock signals of the same phase, both a case where the phase of the RF2 signal is caused to lag behind the phase of the RF1 signal and a case where the phase of the RF2 signal is caused to lead the phase of the RF1 signal can be addressed in connection with the addition timing of the adder 16.

Specifically, the CLK2-PH-4 and the CLK2-PH4 clock signals are illustrated. When the CLK2-PH-4 clock signal is supplied as the clock signal CLK2 to the A/D 14, the A/D 14 converts the RF2 signal into a digital signal at timing T1; the A/D12 converts the RF1 signal into a digital signal at timing T0; and the adder 16 adds the digital signals at timing T3 in accordance with the clock signal CLK1 for addition synchronized with the signal output from the VCO. This corresponds to the phase of the RF1 signal being delayed behind the phase of the RF2 signal by 4/8 T; namely, the phase of the RF2 signal being caused to lead the phase of the RF1 signal by 4/8 T. Meanwhile, when the CLK2-PH4 clock signal is supplied as the clock signal CLK2 to the A/D 14, the A/D 12 converts the RF1 signal into a digital signal at timing T0; and the A/D 14 converts the RF2 signal into a digital signal at timing T2. The adder 16 adds these digital signals at timing T4 based on the clock signal CLK2 for addition. This corresponds to the phase of the RF2 signal being delayed behind the phase of the RF1 signal by 4/8 T. In the case of the CLK2-PH-7 to CLK2-PH-1 clock signals, the phase-variable frequency divider 26 supplies the clock signal CLK1 for addition purpose to the adder 16. In the case of the CLK2-PH0 to CLK2-PH7 clock signals, the phase-variable frequency divider 26 supplies the clock signal CLK2 for addition purpose to the adder 16. The clock signal CLK2 for addition purpose is generated by means of delaying the clock signal CLK1 for addition purpose by four clock periods. From the above, the RF2 signal can compensate for the phase difference between the RF1 signal and the RF2 signal regardless of the nature of the phase difference with respect to the RF1 signal (including a case where the phase of the RF2 signal leads the phase of the RF1 signal and a case where the phase of the RF2 signal lags behind the phase of the RF1 signal).

Generally, in a case where the optical disk is a CD/DVD-R, no substantial phase difference arises. In the case of a CD/DVD-ROM, the following-side signals tend to delay in phase. In the case of a CD/DVD-RW, the following-side signals tend to advance in phase. Therefore, in the case of R-series optical disks, the clock signal CLK2 is not adjusted. In the case of ROM-series optical disks, adjustment is performed so as to advance the phase of the clock signal CLK2. In the case of RW-series optical disks, adjustment can be limited to that for delaying the phase of the clock signal CLK2. As a result, an attempt to shorten an adjustment time can be realized.

A specific processing algorithm is as follows. First, when an optical disk is placed on the optical disk apparatus, an optical pickup is caused to seek an area where RF data already exist and reproduce data before reproduction of data, among areas in the optical disk, thereby acquiring the RF1 signal and the RF2 signal. The phase of the clock signal CLK2 and the addition timing of the adder 26 are changed by means of the CPU 24 and the phase-variable frequency divider 26. The clock signal CLK2 assumes any of 15 possible phases, and the clock signal CLK for addition purpose assumes any of two possible phases. So long as the phase of the clock signal CLK2 is determined, the phase of the clock signal CLK for addition purpose is also determined correspondingly. In relation to each of the clock signals CLK2, the CPU 24 evaluates jitter of the reproduction signal output from the adder 26 and an error rate of a signal demodulated by the decoder 20. In a case where PRML (Partial Response Maximum Likelihood) processing is performed, the CPU 24 evaluates a reproduction signal such as a PRSNR signal, an, SbER signal, or the like. In this way, the phase of the clock signal CLK2 having the best quality is selected. After the clock signal CLK2 has been optimized through processing mentioned above, data are reproduced from the optical disk.

Alternatively, in the processes of manufacture of an optical disk apparatus, the quality of a reproduction signal is evaluated by means of the above algorithm in connection with various optical disks and various rotational speeds, to thus learn the optimum phase of the clock signal CLK2 and the optimum addition timing. The thus-learned phase and timing may also be stored in nonvolatile memory 30 in the optical disk apparatus. When an optical disk is loaded, the CPU 24 reads the type of the optical disk from the disk information recorded in a lead-in area; reads the phase of the clock signal CLK 2 and addition timing, which are appropriate for a reproduction speed, from the nonvolatile memory 30; and sets the thus-read phase and timing. Although the phase of the clock signal CLK2 stored in the nonvolatile memory 30 is specified as a two-dimensional map in which each type of an optical disk and each reproduction speed are plotted, the phase may be simply specified as a one-dimensional map in which each type of an optical disk is plotted. In this case, the CPU 24 adjusts the phase of the clock signal CLK2 for each type of an optical disk without regard to a reproduction speed. As mentioned above, the phase difference between the RF1 signal and the RF2 signal can also change according to a reproduction speed as well as according to the type of an optical disk. Accordingly, the phase difference is preferably adjusted in consideration of a reproduction speed as well as the type of an optical disk.

In the present embodiment, the oscillation frequency of an output from the VCO 22e of the PLL 22 is set to eight times the frequency of the channel clock signal. However, the accuracy of adjustment of a phase difference can be enhanced by means of increasing the oscillation frequency to much higher than eight times.

Moreover, the present embodiment employs the four-quadrant photodetection section 10a. However, the essential requirement is to split a photodetection section into two or more photodetectors, one or more photodetectors on the leading side and one or more photodetectors on the following side with respect to the advancing direction of a pit. Accordingly, a two-quadrant photodetection section or a six-quadrant photodetection section may be employed instead of the four-quadrant photodetection section.

Meanwhile, in an optical disk of the next generation such as an HD-DVD or a BD (Blue-ray Disc), a reproduction signal is susceptible to intersymbol interference arising between a preceding pit and a subsequent pit because of a restricted relationship between a pit of the optical disk and the diameter of a laser spot. During reproduction of a signal, interference is positively utilized, to thus reproduce a signal according to a PRML (Partial Response Maximum Likelihood) scheme. PRML is a signal processing scheme for reading the most probable data from the reproduction signal on the premise of interference between a preceding pit and a subsequent pit; and corresponds to a combined technique of a PR detection technique of recording or reproducing data, which remain in a narrow frequency band, without reducing waveform interference and an ML decoding technique of decoding the most probable bit string from a plurality of reproduction signal trains rather than making a determination on a per-bit basis. Although an HD-DVD of PR class is given PR[1, 2, 2, 2, 1] for reasons of transmission characteristics achieved between a medium and a pickup, the HD-DVD adopts a modulation code of the shortest inversion 2T (T denotes a reference time length). The HD-DVD counters a problem of a failure to achieve the amplitude of a 2T signal at PR[1, 2, 2, 2, 1]. In normal times, when a signal is evaluated, the jitter of the 2T signal is evaluated. However, in the case of the HD-DVD, the amplitude of the 2T signal is not acquired, so that the signal cannot be evaluated. For this reason, a PRSNR technique, an sBER technique, or the like is used in place of the PRML technique. For example, PRSNR is acquired by means of cumulatively summing, over a predetermined period, SNRs (signal-to-noise ratios) acquired by means of incorporation of intersymbol interference of signals generated by a PR equalizer. Since the PRSNR cannot be evaluated for each T, difficulty is encountered in tuning a strategy, or the like, during recording operation.

There will be described hereinbelow an optical disk apparatus capable of reliably evaluating the quality of a signal of an optical disk, such as an HD-DVD, a BD, or the like, where the shortest pit length is considerably short on the order of, e.g., 2T; specifically, a signal of a high-density optical disk.

First, the basic principle of the present embodiment will be described. When a four-quadrant photodetection section is used, a reproduction RF signal is obtained by means of adding all of signals A to D from respective elements (the photodetectors A to D) of the four-quadrant photodetection section.

A reproduction RF signal=a signal A+a signal B+a signal C+a signal D

The photodetector A and the photodetector D are elements which lead timewise. A signal A+a signal D corresponds to a signal on a leading side; and a signal B+a signal C corresponds to a signal on a following side. The reproduction RF signal is decoded by means of the PRML technique. In the PRML technique, a continual reproduction signal acquired at time N is compared with a target signal, thereby binarizing the most probable bit string. A direct slicing method is usually used as a method for reproducing data from an optical disk. When the bit length is 2T, the amplitude of a signal is small, and hence difficulty is encountered in extracting a 2T signal under the direct slicing method. Under the PRML method, a target signal exhibiting the time shift closest to that exhibited by the reproduction signal is selected, and a bit string used for generating a target signal is output as a result of decoding. The target signal is computed by means of convolution of a designated impulse response (of PR class) and a bit string. Therefore, a PR class appropriate for the recording density of an optical desk is selected. On the assumption that the PR class is expressed by PR[a, b], PR[1, 1] shows a characteristic of an impulse response appearing at two continual points of identification at a 1:1 ratio. Consequently, an output in response to an input [0 ●●1 ●●●] becomes [0●●1 1 ●●.]. Further, PR[1, 2, 1] shows a characteristic of an impulse response appearing at three continual points of identification at a 1:2:1 ratio. Therefore, an output in response to an input [0 ●●1 ●●] becomes [0 ●–1 2 1 ●●]. In the case of an HD-DVD, a PR class is expressed as PR[1, 2, 2, 2, 1], which shows that an impulse response appears at five continual points of identification at a 1:2:2:2:1 ratio. When reflected light from the HD-DVD is received by a four-quadrant photodetection section and signals are divided into the signal A+the signal D and the signal B+the signal C, the PR class of the signal A+the signal D can be deemed as PR[1, 2, 1], and the PR class of the signal B+the signal C can be deemed as PR [1, 2, 1], which is delayed in time behind the signal A+the signal D by 2T. The signal A+the signal D, which lead timewise, are expressed as PR[1, 2, 1, 0, 0]. The signal B+the signal C, which lag timewise, are expressed as [0, 0, 1, 2, 1]. As a result of addition of these signals, PR[1, 2, 1, 0, 0]+PR[0, 0, 1, 2, 1]=PR[1, 2, 2, 2, 1] can be deemed.

It is assumed that the signal A+the signal D, which are signals on the leading side, are delayed by 2T by means of the delay circuit. In this case, the PR class of the signal A+the signal D becomes PR[0, 0, 1, 2, 1], and hence a reproduction RF signal acquired by addition of all the signals is expressed as PR[0, 0, 1, 2, 1]+PR[0, 0, 1, 2, 1]=PR[0, 0, 2, 4, 2]=PR[0, 0,1, 2, 1]. Thus, the reproduction RF signal becomes essentially equal to PR[1, 2, 1]. The amplitude of the 2T signal becomes smaller at PR[1, 2, 2, 2, 1] for reasons of intersymbol interference and is difficult to detect. When the class has become lower to PR[1, 2, 1], an impulse response appears at three points of identification at a 1:2:1 ratio. Hence, intersymbol interference is small, and the amplitude of a signal of 2T pit length is detected sufficiently largely.

In the present embodiment, the PR class is substantially converted by means of delaying the leading signals by a predetermined amount, thereby enabling detection of the amplitude of a signal of 2T pit length, which is the shortest pit length. The signals on the leading side are delayed, and the amount of delay is set according to the number of pieces into which a photodetector is split and a leading time. When the photodetector is split into two in the direction of a track, signals on the leading side lead by 2T. Alternatively, signals on the following side are deemed to delay, and the signals on the leading side are delayed by 2T. The signals on the following side are output in unmodified form without being delayed, and the delayed signals on the leading side and the undelayed signals on the following side are added. The signals on the leading side may be output in unmodified form, and the signals on the following side may be added after the phase of the signals on the following side has been caused to advance 2T. The delay circuit can be formed from an arbitrary delay processing element. When an RF signal is converted into a digital signal, the signal may also be delayed by a digital delay element.

Likewise, the present embodiment can be applied to a BD as well as to an HD-DVD. A BD is set on per-recording-density basis as a first generation (compatible with 23.3 GB) : PR[1, 2, 1], a second generation (compatible with 25 GB) : PR[1, 2, 2, 1], a third generation (compatible with 27 GB) PR[l, 2, 2, 2, 1], and the like. The third-generation DB is processed in the same manner as is the HD-DVD. Moreover, the second-generation BD can be processed by means of changing the method for splitting the photodetector 10*a*.

Figure 6:
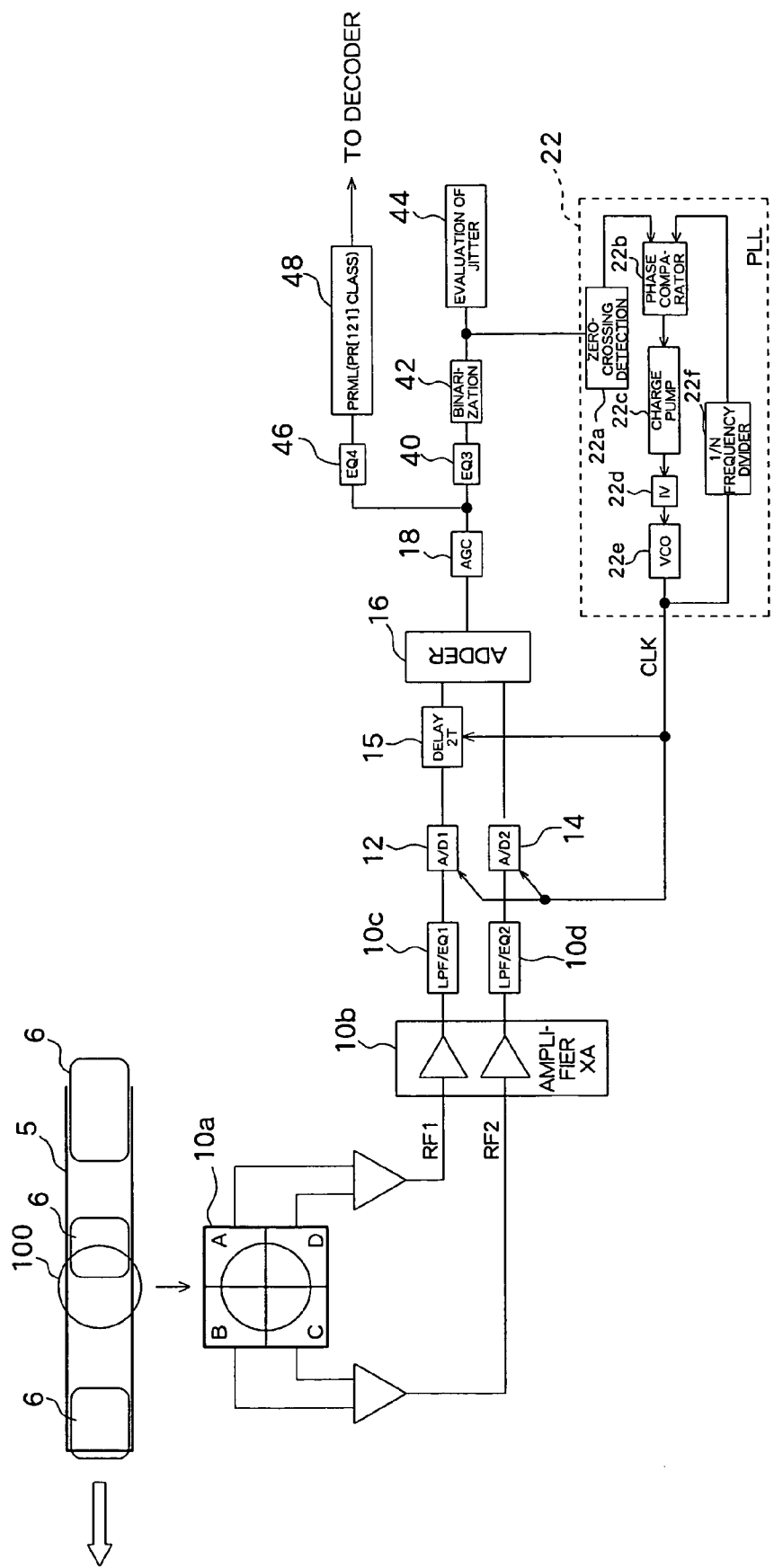
FIG. 6 is a configuration block diagram of a reproduction system of an optical disk apparatus according to another embodiment of the present invention.

FIG. 6 shows a configuration block diagram of a reproduction system of the present embodiment. This embodiment relates to a case where an HD-DVD having a PR class of PR[1, 2, 2, 2, 1] is reproduced. A laser beam 100 is radiated onto the pit 6 formed in the track of the optical disk 5. The light reflected from the pit is detected by means of the four-quadrant photodetection section 10*a* of the optical pickup. The four-quadrant photodetection section 10*a* is formed from four photodetectors A to D. The photodetectors A and D are placed on the leading side in the moving direction of the track (the direction of the arrow in the drawing), and the photodetectors B and C are placed on the following side in the moving direction of the track. When the positions of the photodetectors B and C are taken as reference positions, the photodetectors A and D are located on the leading side. Signals output from the photodetectors A and D are added, and a resultant signal is supplied as an RF1 signal to an amplifier 10*b*. Signals output from the detectors B and C are added, and a resultant signal is supplied as an RF2 signal to the amplifier 10*b*.

The amplifier 10*b* amplifies the signals at a gain A, and supplies the thus-amplified signals to the low-pass-filter-and-equalizers LPF/EQ 10*c*, 10*d*.

The LPF/EQ 10*c* and the LPF/EQ 10*d* eliminate high-frequency noise from the RF 1 signal and the RF 2 signal, or slightly boost a specific frequency band and supply the thus-boosted frequency band to the A/D 12 and the A/D 14. The LPF/EQ 10*c* and the LPF/EQ 10*d* are preferably of the same characteristics; and may also be a plain LPF or may also exhibit a slight boosting characteristic in the vicinity of the highest frequency.

The A/D 12 and the A/D 14 convert the RF1 signal and the RF2 signal into digital signals. Conversion timing of the A/D 12 and conversion timing of the A/D 14 are determined by the clock signal CLK. The RF1 signal and the RF2 signal are sampled at the rise timing of the clock signal CLK and converted into a digital signal. The clock signal CLK is generated by the PLL 22, and the thus-generated clock signal is supplied to the A/D 12 and the A/D 14.

A delay element (a digital delay element) 15 delays the digital RF1 signal by 2T and outputs the thus-delayed signal to the adder 16. Delaying operation is performed in synchronism with the clock signal CLK, and the clock signal CLK is supplied from the PLL 22. Meanwhile, the digital RF2 signal is supplied in unmodified form to the adder 16 without being delayed by the delay element 15.

The adder 16 adds the digital RF1 signal delayed by 2T and the non-delayed digital RF2 signal, to thus generate a reproduction signal. After the gain of the reproduction signal has been adjusted by the AGC 18, the reproduction signal is supplied to a PRML processing section 48 via an equalizer 46. The PRML processing section 48 has a PR equalizer and a Viterbi decoder, and subjects the reproduction signal whose waveform has been equalized by the PR equalizer to Viterbi decoding. Here, Viterbi decoding is for selecting, from all encoding strings satisfying predetermined PR characteristics, a code string having the smallest error with respect to the sample string of the code equalized by the PR equalizer; namely, a code string having the maximum likelihood, and for performing decoding operation appropriate for the selected code string. In the HD-DVD, the PR equalizer is assumed to exhibit PR[1, 2, 2, 2, 1] as an PR characteristic. In the present embodiment, signals on the leading side are delayed by 2T by means of the delay element 15, and the thus-delayed signals are added with signals on the following side, whereby the PR class is essentially made lower to PR[1, 2, 1]. Hence, the PR equalizer performs equalizing operation while taking the PR class as PR[1, 2, 1]. Moreover, the signal output from the AGC 18 is supplied to a jitter evaluation circuit 44 by way of an equalizer 40 and a binarizer circuit 42, whereby the jitter is evaluated. In addition to jitter, a deviation may also be evaluated. The binarized signal is supplied to the PLL 22, as well, where a clock signal CLK is generated. The PLL 22 comprises the zero-crossing detector 22*a* for detecting that the reproduction signal from the AGC 18 crosses a zero point; the phase comparator 22*b*; the charge pump 22*c*; the current-to-voltage converter (IV) 22*d*; the voltage-controlled oscillator (VCO) 22*e*; and the 1/N frequency divider 22*f*. The clock signal CLK output from the VCO 22*e* is supplied to the A/D 12 and the A/D 14.

Figure 7:
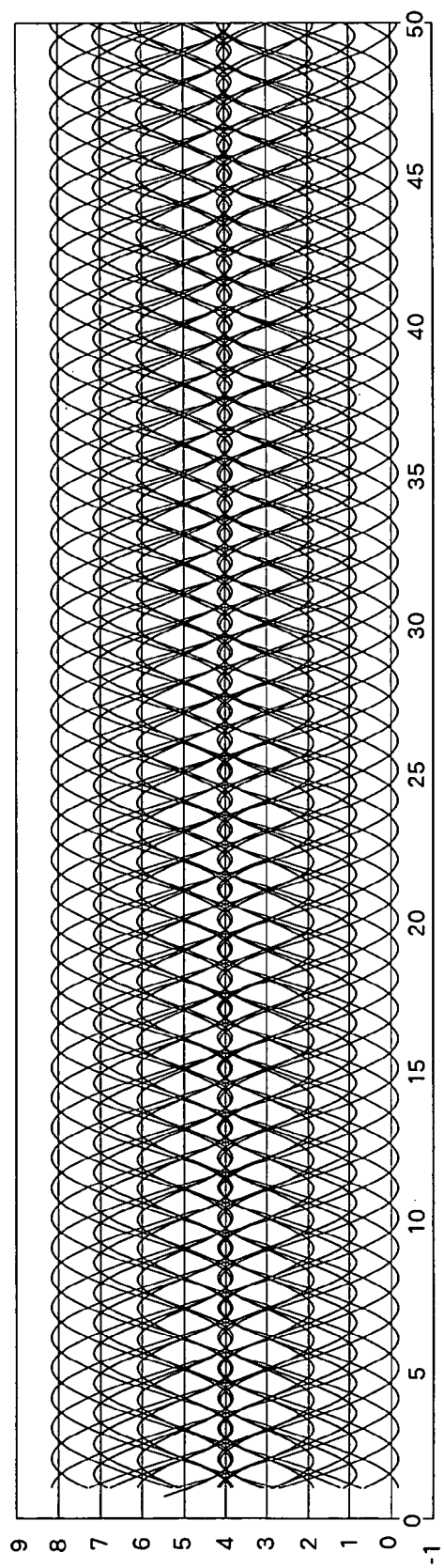
FIG. 7 is an eye pattern of PR [1, 2, 2, 2, 1]
Figure 8:
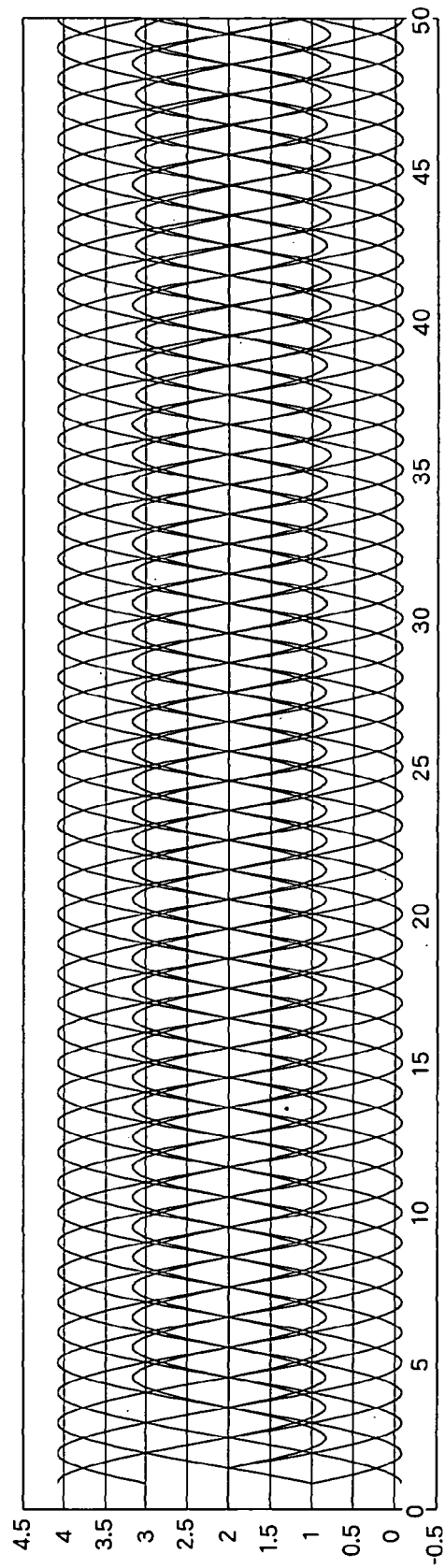
FIG. 8 is an eye pattern of PR [1, 2, 1]

FIG. 7 shows an eye pattern of PR[1, 2, 2, 2, 1], and FIG. 8 shows an eye pattern of PR[1, 2, 1]. In FIG. 7, the amplitude of the 2T signal is substantially zero. In FIG. 8, the amplitude of the 2T signal is large and can be readily decoded. Since the jitter evaluation circuit 44 can evaluate the jitter of a signal having a 2T pit length, the strategy can be tuned readily.

Figure 9:
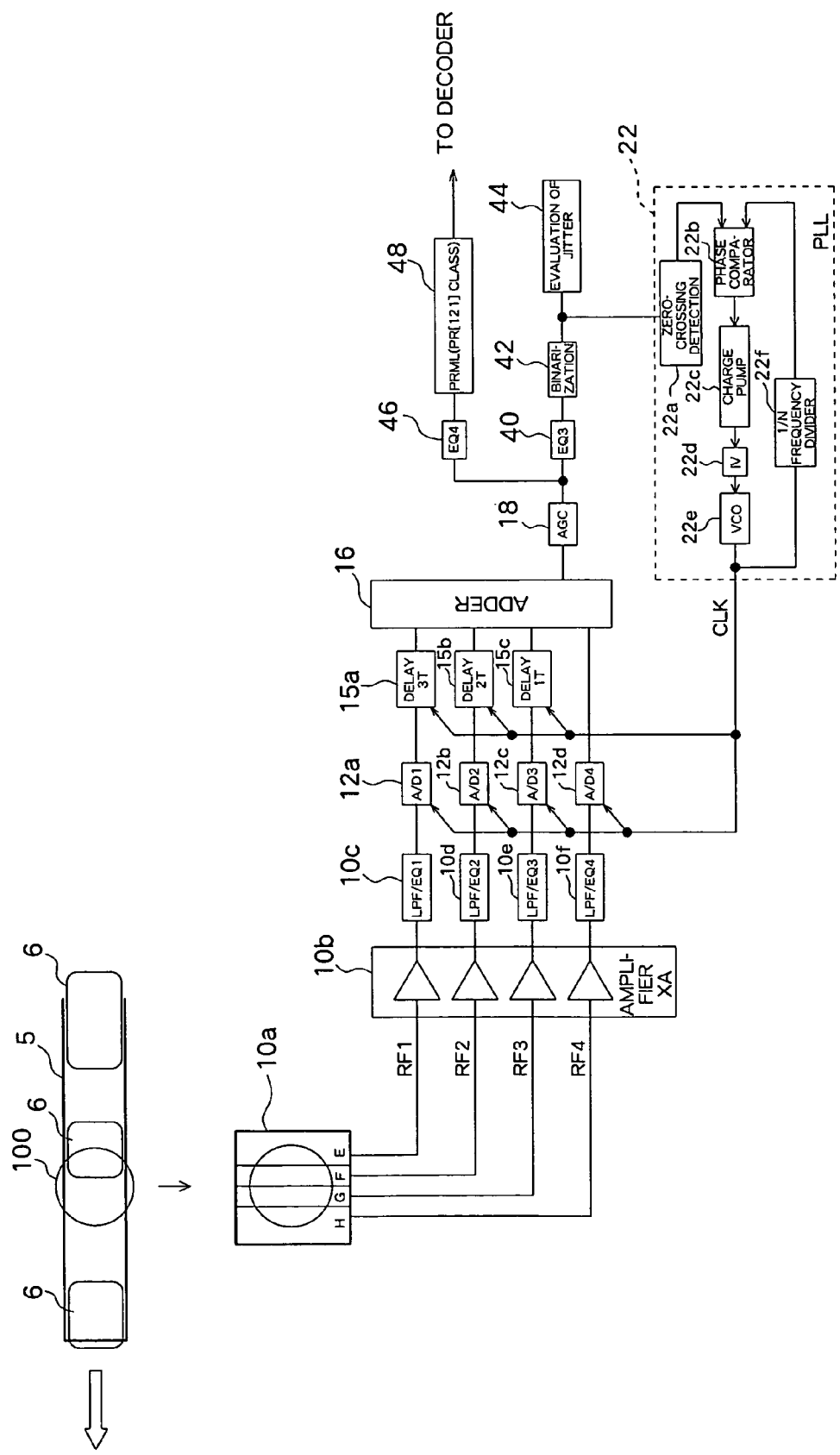
FIG. 9 is a configuration block diagram of a reproduction system of yet another embodiment of the present invention.

FIG. 9 shows a configuration block diagram of the optical disk apparatus of the other embodiment. This embodiment shows a case where an HD-DVD is reproduced. The photodetection section 10*a* is split into four quadrants in the direction of the track, to thus create photodetectors E, F, G, H. With reference to the photodetector H, the photodetectors E, F, G are located at leading positions. The photodector E is located at the furthest leading position. An RF1 signal output from the photodetector E is amplified by the amplifier 10*b*. Noise is eliminated from the RF1 signal by the LPF/EQ 10*c*. After having been converted into a digital signal by the A/D 12*a*, the RF1 signal is delayed by the delay element 15*a*. The amount of delay is 3T. An RF2 signal output from the photodetector F is amplified by the amplifier 10*b*, and noise is eliminated from the RF2 signal by the LPF/EQ 10*d*. After having been converted into a digital signal by the A/D 12*b*, the RF2 signal is delayed by the delay element 15*b*. The amount of delay is 2T. An RF3 signal output from the photodetector G is amplified by the amplifier 10*b*, and noise is eliminated from the RF3 signal by the LPF/EQ 10*e*. After having been converted into a digital signal by the A/D 12*c*, the RF3 signal is delayed by the delay element 15*c*. The amount of delay is T. An RF4 signal output from the photodetector H is amplified by the amplifier 10*b*. Noise is eliminated from the RF4 signal by the LPF/EQ 10*f*. After having been converted into a digital signal by the A/D 12*d*, the signal is output without being delayed. Each of the A/D 12*a* to the A/D 12*d* converts an input RF signal into a digital signal in accordance with a clock signal CLK generated by the PLL 22. The adder 16 adds the four signals and outputs the resultant signal as a reproduction signal.

The PR class of the RF1 signal can be expressed as PR[1, 1, 0, 0, 0]. Further, the PR class of the RF2 signal can be expressed as PR[0, 1, 1, 0, 0]. The PR class of the RF3 signal can be expressed as PR[0, 0, 1, 1, 0]. The PR class of the RF4 signal can be expressed as PR[0, 0, 0, 1, 1]. As a result of simple addition of these signals, PR[1, 2, 2, 2, 1] can be acquired. However, in the present embodiment, the RF1 signal is delayed by 3T; the RF2 signal is delayed by 2T; and the RF3 signal is delayed by T. The RF1 signal is delayed by 3T, whereby PR[0, 0, 0, 1, 1] is achieved. The RF2 signal is delayed by 2T, whereby PR[0, 0, 0, 1, 1] is achieved. The RF3 signal is delayed by T, whereby PR[0, 0, 0, 1, 1] is achieved. A signal achieved by addition of these signals with use of the adder 16 is expressed as PR[0, 0, 0, 4, 4]. Thus, the signal becomes substantially equal to PR[1, 1]. Therefore, a signal having a 2T pit length can be detected as a sufficiently large amplitude and decoded.

The configuration shown in FIG. 6 can be applied to a case where the BD of PR[1, 2, 2, 1] is reproduced. In this case, the RF1 signal can be deemed to be PR[1, 2, 0, 0], and the RF2 signal can be deemed to be PR[0, 0, 2, 1]. Accordingly, the RF1 signal is delayed by 2T by means of the delay element 15, whereby the PR class of the delayed RF1 signal is expressed as PR[0, 0, 1, 2]. A signal generated by means of addition of these signals by use of the adder 16 is expressed as PR[0, 0, 0, 3, 3]. Thus, the signal becomes essentially equal to PR[1, 1]. Consequently, a signal having a 2T pit length is also detected and decoded in the form of a sufficiently-large amplitude.

Figure 10:
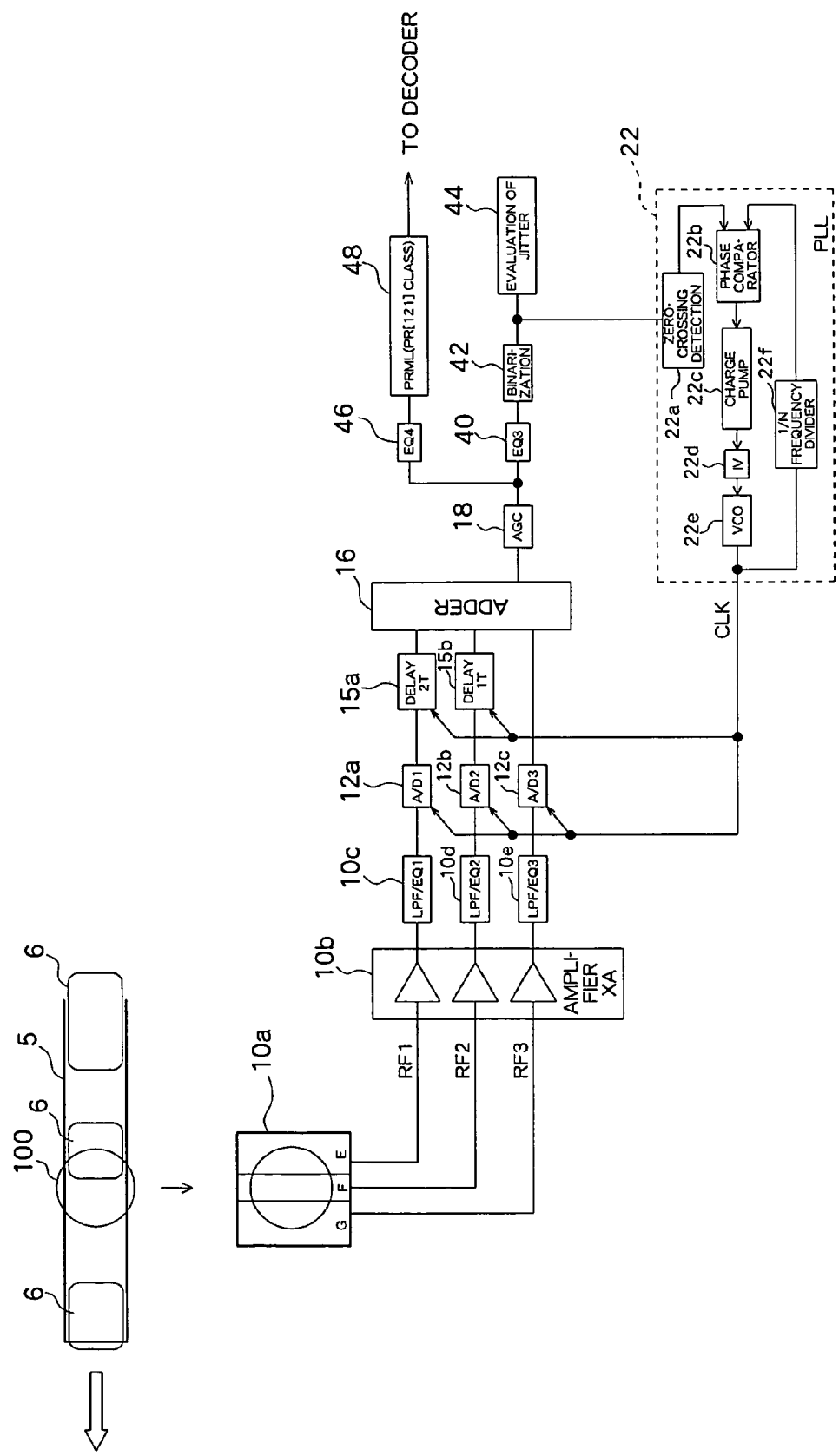
FIG. 10 is a configuration block diagram of a reproduction system of still another embodiment of the present invention.

FIG. 10 shows a configuration block diagram of an optical disk apparatus of still another embodiment. This embodiment relates to a case where a BD of PR[1, 2, 2, 1] is reproduced. The photodetector 10a is split into three quadrants in the direction of a track, to thus create photodetectors E, F, and G. With reference to the photodetector G, the photodetectors E, F are located at leading positions. The photodetector E is located at the furthest leading position. The RF1 signal output from the photodetector E is amplified by the amplifier 10b, and noise is eliminated from the signal by the LPF/EQ 10c. After having been converted into a digital signal by the A/D 12a, the signal is delayed by the delay element 15a. The amount of delay is 2T. The RF2 signal output from the photodetector F is amplified by the amplifier 10b. Noise is eliminated from the signal by the LPF/EQ 10d. After having been converted into a digital signal by the A/D 12b, the signal is delayed by the delay element 15b. The amount of delay is T. The RF3 signal output from the photodetector G is amplified by the amplifier 10b, and noise is eliminated from the thus-amplified signal by the LPF/EQ 10e. After having been converted into a digital signal by the A/D 12c, the signal is output without being delayed. Each of the A/D 12a to A/D 12c converts the input RF signal into a digital signal according to the clock signal CLK generated by the PLL 22. The adder 16 adds these three signals, and outputs a resultant signal as a reproduction signal.

The PR class of the RF1 signal can be expressed as PR[1, 1, 0, 0]. The PR class of the PR2 signal can be expressed as PR[0, 1, 1, 0]. Further, the PR class of the RF3 signal can be expressed as PR[0, 0, 1, 1]. By means of mere addition of these signals, PR[1, 2, 2, 1] is achieved. Incidentally, in the present embodiment, the RF1 signal is delayed by 2T, and the RF2 signal is delayed by T. The RF1 signal is delayed by 2T, whereby PR[0, 0, 1, 1] is achieved. The RF2 signal is delayed by T, whereby PR[0, 0, 1, 1] is achieved. A signal determined by addition of these signals by means of the adder 16 is expressed as PR[0, 0, 3, 3]. Thus, the signal becomes essentially equal to PR[1, 1]. Consequently, the signal having a 2T pit length is also detected in the form of a sufficiently-large amplitude and decoded.

What is claimed is:

1. An optical disk apparatus comprising:
   light-receiving means split into at least two elements in a direction of a track of an optical disk, each of the split elements subjecting light reflected from the optical disk to photoelectric conversion and outputting a first reproduction RF signal and a second reproduction RF signal;
   first analog-to-digital conversion means for converting the first reproduction RF signal into a digital signal, to thereby output a first digital signal;
   second analog-to-digital conversion means for converting the second reproduction RF signal into a digital signal, to thereby output a second digital signal;
   addition means for adding the first digital signal to the second digital signal, to thereby output a signal;
   first clock supply means for supplying a first clock signal used for issuing a conversion timing to the first analog-to-digital conversion means;
   second clock supply means for supplying a second clock signal used for issuing a conversion timing, which is different from the conversion timing for the first analog-to-digital conversion means, to the second analog-to-digital conversion means, and delaying or advancing the second reproduction RF signal compared to the first reproduction RF signal; and
   adjustment means for compensating for a phase difference between the first reproduction RF signal and the second reproduction RF signal by means of adjusting a phase difference between the first clock signal and the second clock signal based on an amount of phase difference between the first reproduction RF signal and the second reproduction RF signal.

2. The optical disk apparatus according to claim 1, further comprising:
   third clock supply means for supplying a third clock signal used for issuing addition timing to the addition means, wherein the adjustment means adjusts a phase difference between the first clock signal and the second clock signal, as well as adjusting the phase of the third clock signal.

3. The optical disk apparatus according to claim 1, wherein the second clock supply means supplies, as the second clock signal, a plurality of clock signals differing in phase from the first clock signal; and
   the adjustment means detects the quality of a reproduction signal acquired when the plurality of clock signals are respectively supplied, and selects a clock signal, by means of which the best quality of a reproduction signal is detected, thereby adjusting a phase difference between the first and second clock signals.

4. The optical disk apparatus according to claim 3, wherein the second clock supply means supplies, as a plurality of clock signals having phase differences, a clock signal delaying in phase behind the first clock signal and a clock signal leading the first clock signal in phase.

5. The optical disk apparatus according to claim 2, further comprising:
   a PLL circuit for generating a clock signal synchronized with a signal from the addition means, wherein
   the first clock supply means, the second clock supply means, and the third clock supply means respectively generate the first clock signal, the second clock signal, and the third clock signal in synchronism with the clock signal from the PLL circuit.

6. The optical disk apparatus according to claim 1, further comprising:
   disk information acquisition means for reading the type of an optical disk; and
   storage means for storing beforehand an optimal phase difference of the second clock signal with respect to the first clock signal for each type of an optical disk, wherein
   the adjustment means reads, from the storage means, an optimal phase difference corresponding to the type of an optical disk read by the disk information acquisition means, to thus adjust the phase of the second clock signal.

7. The optical disk apparatus according to claim 6, wherein the storage means stores beforehand an optimal phase difference of the second clock signal with respect to the first clock signal for each type of optical disk and each reproduction speed; and
   the adjustment reads, from the storage means, the optimal phase difference corresponding to the type of the optical disk read by the disk information acquisition means and a reproduction speed achieved during reproduction of data, to thus adjust the phase of the second clock signal.

8. An optical disk apparatus for reproducing data recorded in an optical disk by use of a PRML technique, comprising:
   light-receiving means which is split into a plurality of elements in a direction of a track of an optical disk, each of the thus-split elements subjecting light reflected from the optical disk to photoelectric conversion and outputting an RF signal in a predetermined PR class;
   delay means for delaying an RF signal of a timewise-leading element, from among RF signals from the respective elements, by an amount of delay corresponding to the number of elements into which the light-receiving means is split and a leading time, wherein the amount of delay varies based on from which of the respective elements the corresponding RF signals are outputted; and
   addition means for adding delayed RF signals of the respective elements and converting the PR class of the RF signals output from the light-receiving means.

9. The optical disk apparatus according to claim 8, wherein the light-receiving means is split into two elements in the direction of the track; and
   the delay means delays, by 2T (where T denotes a reference time length), an RF signal of a leading element among RF signals of the two split elements.

10. The optical disk apparatus according to claim 8, wherein the light-receiving means is split into four elements in the direction of the track; and
    the delay means delays, by 3T, 2T, and T (T denotes a reference time length), RF signals of three leading elements among the RF signals of the four split elements.

11. The optical disk apparatus according to claim 8, wherein the light-receiving means is split into three elements in the direction of the track; and
    the delay means delays, by 2T and T (T denotes a reference time length), RF signals of two leading elements among the RF signals of the three split elements.

12. An optical disk apparatus for reproducing data recorded in an optical disk by use of a PRML technique, comprising:
    light-receiving means which is split into a plurality of elements in a direction of a track of an optical disk, each of the thus-split elements subjecting light reflected from the optical disk to photoelectric conversion and outputting an RF signal in a predetermined PR class;
    delay means for delaying an RF signal of each of timewise-leading elements, from among RF signals from the respective elements, by an amount of delay corresponding to the number of elements into which the light-receiving means is split and a leading time, wherein the amount of delay varies based on from which of the respective elements the corresponding RF signals are outputted;
    addition means for adding delayed RF signals of the respective elements and converting the PR class of the RF signals output from the light-receiving means;
    demodulation means for effecting demodulation by means of the PRML technique through use of an output from the addition means; and
    evaluation means for evaluating jitter of a reproduction signal by use of the output from the addition means.

13. An optical disk apparatus; comprising:
    a light-receiving section that is split into a plurality of elements in a direction of a track of an optical disk, each of the plurality of elements subjecting light reflected from the optical disk to photoelectric conversion and outputting corresponding RF signals;
    a delay element configured to delay the corresponding RF signals by respective delay amounts corresponding to the number of the plurality of elements into which the light-receiving section is split, wherein the respective delay amounts vary based on from which of the plurality of elements the corresponding RF signals are outputted; and
    an adder configured to add the delayed corresponding RF signals and to output a reproduced signal.

14. The optical disk apparatus of claim 13, further comprising:
    a decoder configured to demodulate the reproduced signal by use of a PRML technique.

* * * * *